US011035611B2

(12) United States Patent
Baxter et al.

(10) Patent No.: US 11,035,611 B2
(45) Date of Patent: Jun. 15, 2021

(54) METHOD OF SEPARATING COMPONENTS OF A GAS

(71) Applicant: Sustainable Energy Solutions, Inc., Provo, UT (US)

(72) Inventors: Larry Baxter, Orem, UT (US); Chris Hoeger, Provo, UT (US); Jacom Chamberlain, Provo, UT (US); Kyler Stitt, Lindon, UT (US)

(73) Assignee: Sustainable Energy Solutions, Inc., Ball Ground, GA (US)

( * ) Notice: Subject to any disclaimer, the term of this patent is extended or adjusted under 35 U.S.C. 154(b) by 0 days.

(21) Appl. No.: 16/035,550

(22) Filed: Jul. 13, 2018

(65) Prior Publication Data
US 2020/0018545 A1    Jan. 16, 2020

(51) Int. Cl.
| | | |
|---|---|---|
| *F25J 3/02* | (2006.01) | |
| *F25J 3/08* | (2006.01) | |
| *B01D 5/00* | (2006.01) | |
| *B01D 53/00* | (2006.01) | |
| *F25J 3/06* | (2006.01) | |

(52) U.S. Cl.
CPC .............. *F25J 3/08* (2013.01); *B01D 53/002* (2013.01); *F25J 3/067* (2013.01); *F25J 3/0615* (2013.01)

(58) Field of Classification Search
CPC ...... F25J 3/02; F25J 3/0209; F25J 3/08; F25J 2210/60; F25J 2270/08; B01D 5/0027

USPC .................................................... 62/625, 632
See application file for complete search history.

(56) References Cited

U.S. PATENT DOCUMENTS

| | | | | |
|---|---|---|---|---|
| 3,376,709 A | * | 4/1968 | Dickey | ...................... C07C 7/14 62/637 |
| 4,563,202 A | * | 1/1986 | Yao | ......................... F25J 3/0209 2/17 |
| 8,764,885 B2 | * | 7/2014 | Baxter | .................. B01D 53/002 95/226 |
| 2019/0128603 A1 | * | 5/2019 | Baxter | ...................... B01D 7/02 |

* cited by examiner

*Primary Examiner* — Frantz F Jules
*Assistant Examiner* — Erik Mendoza-Wilkenfel
(74) *Attorney, Agent, or Firm* — Cook Alex Ltd.; R. Blake Johnston (57) ABSTRACT

The disclosure provides a method for separating components of a gas. A feed gas stream is cooled in a first vessel. The feed gas stream includes methane, water, carbon dioxide, and Natural Gas Liquids. The feed gas stream is cooled in a first vessel. A portion of the water condenses to form a primary liquid stream, resulting in a first depleted gas stream, which is cooled in a second vessel. A portion of the NGLs condense to form a secondary liquid stream, resulting in a second depleted gas stream, which is cooled in a condensing exchanger. A first portion of the methane condenses to form a liquid methane stream, resulting in a third depleted gas stream, which is cooled in a third vessel. A portion of the carbon dioxide condenses, desublimates, or condenses and desublimates as a final product stream, also resulting in a fourth depleted gas stream.

19 Claims, 5 Drawing Sheets

401
Pass a feed gas stream into a vessel, the feed gas stream consisting of methane, carbon dioxide, and water

402
Cool the feed gas stream in the vessel such that a portion of the methane, a first portion of the carbon dioxide, and a first portion of the water condense as a product liquid stream and resulting in a depleted gas stream.

METHOD OF SEPARATING COMPONENTS OF A GAS

GOVERNMENT INTEREST STATEMENT

This invention was made with government support under DE-FE0028697 awarded by the Department of Energy. The government has certain rights in the invention.

TECHNICAL FIELD

The devices and processes described herein relate generally to separation of gases.

BACKGROUND

Separating gases from other gases is a challenge in any industry. In some instances, such as in natural gas production, the gases to be removed can not only lower the value of the natural gas but can make it unusable unless purified. Many processes exist for stripping contaminants out of natural gas, but they suffer from a variety of downsides. Some are energy inefficient. Some have limited extraction capacity. Some are not feasible in remote locations, where natural gas is typically located. Energy efficient and cost-effective methods for purifying natural gas streams are needed.

SUMMARY

In one aspect, the disclosure provides a method for separating components of a gas. A feed gas stream is cooled in a first vessel. The feed gas stream includes methane, water, carbon dioxide, and Natural Gas Liquids (NGLs). The feed gas stream is cooled in a first vessel. A portion of the water condenses to form a primary liquid stream, resulting in a first depleted gas stream. The first depleted gas stream is cooled in a second vessel. A first portion of the NGLs condense to form a secondary liquid stream, resulting in a second depleted gas stream. The second depleted gas stream is cooled in a condensing exchanger. A first portion of the methane condenses to form a liquid methane stream, resulting in a third depleted gas stream. The third depleted gas stream is cooled in a third vessel such that a first portion of the carbon dioxide condenses, desublimates, or condenses and desublimates as a final product stream, also resulting in a fourth depleted gas stream.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, "natural gas" is meant to refer to a methane containing gas stream. Natural gas, as harvested in the field, contains at least water and carbon dioxide. In many instances, natural gas may also contain NGLs, nitrogen, argon, hydrogen sulfide, mercaptans, and hydrogen.

As used herein, the term "NGLs" is meant to refer to compounds selected from the group consisting of ethane, propane, butane, isobutane, pentane, natural gasoline, cyclic hydrocarbons, aromatic hydrocarbons and combinations thereof.

As used herein, "cryogenic" is intended to refer to temperatures below about −58° F. (−50° C.).

As used herein, "desublimate" refers to the process of a gas changing to a solid state directly, without passing through the liquid phase. This is to distinguish it from the term, "condense," which is used herein to refer to the process of a gas changing to a liquid state directly.

As used herein, "liquid-liquid" separators refer to a device that separates one liquid compound from another liquid compound. This includes decanters, centrifuges, settling tanks, thickeners, clarifiers, distillation columns, flash vessels, or similar devices used in the art.

Purifying natural gas can be complex and energy inefficient. The methods, devices, and systems disclosed herein overcome these limitations, as well as providing other benefits that will be apparent to those of skill in the art. A natural gas stream is cooled in a first vessel. This first vessel has the necessary temperature gradients and pressure to condense substantially all of the water present in the natural gas stream, which leaves as a liquid. The resultant first depleted gas stream is then cooled in a second vessel. The second vessel has the necessary temperature gradients and pressure to condense a portion of the natural gas liquids in the natural gas stream to a liquid. The resultant second depleted gas stream is then cooled in a condensing exchanger. This condensing exchanger has the necessary temperature gradients and pressure to condense a portion of the methane into a liquid methane stream. The resultant third depleted gas stream is cooled in a third vessel. The third vessel has the necessary temperature gradients and pressure to desublimate out a first portion of the carbon dioxide as a solid product. The combination of these three exchangers produces benefits far beyond that of each process individually, as detailed below.

The preferred methods, devices, and systems disclosed herein have advantages compared to some current technologies. These may include:

1. Avoiding the chemical hazards and costs associated with amine absorption technologies;

2. Combining natural gas sweetening (carbon dioxide removal), drying (H2O removal), NGLs recovery, and trace gas mitigation (H2S and N2 removal) into an integrated process;

3. Treating natural gas without reducing pressure, thereby decreasing repressurization equipment requirements and costs while also decreasing equipment size;

4. Improving NGLs recovery;

5. Enabling treatment of high-carbon dioxide natural gas streams;

6. Reducing treatment facility size, health and environmental hazards, and capital costs; and, 7. Reducing process energy consumption and cost.

The methods, devices, and systems disclosed may treat natural gas at typical plant delivery pressures of 60-100 bar. The first step of the process removes moisture and, in some embodiments, the least volatile NGLs. These are generally immiscible and therefore easily separated. This may occur in a single vessel (preferably configured as a counter-current spray column, packed column, staged column, or other vessels typically used for direct-contact exchange) to prepare the gas for the second stage. The second stage, consisting of the second vessel and the condensing exchanger, acts as both a heat exchanger and gas treatment stage. A portion of the NGLs are condensed into the second vessel. In some embodiments, a portion of the carbon dioxide condenses with the NGLs in the second vessel. The second vessel reduces the gas temperature to near the dew point of methane. The methane begins condensing in the condensing exchanger. The removal of large volumes of gas in this manner reduces the volumetric flow rate and thus vessel sizes may decrease significantly. The final stage removes a portion of the carbon dioxide, either as a solid or as a carbon dioxide-enriched liquid. In some embodiments, another portion of methane is condensed. The products from the final stage may be rewarmed to near the initial operating temperature by helping to cool upstream flows.

Preferably, the three stages operate in synergy in that each stage may both remove impurities from the natural gas and may cool the natural gas stream in preparation for introduction to the downstream process. Such synergy of the three stages includes both removing the impurities—which otherwise might represent operational difficulties for the downstream process—and cooling the stream. The synergy may extend to the warming portion of the process, in which the cold product streams from each stage contribute to cooling the incoming flows as they warm back toward operating temperatures.

Figure 5:
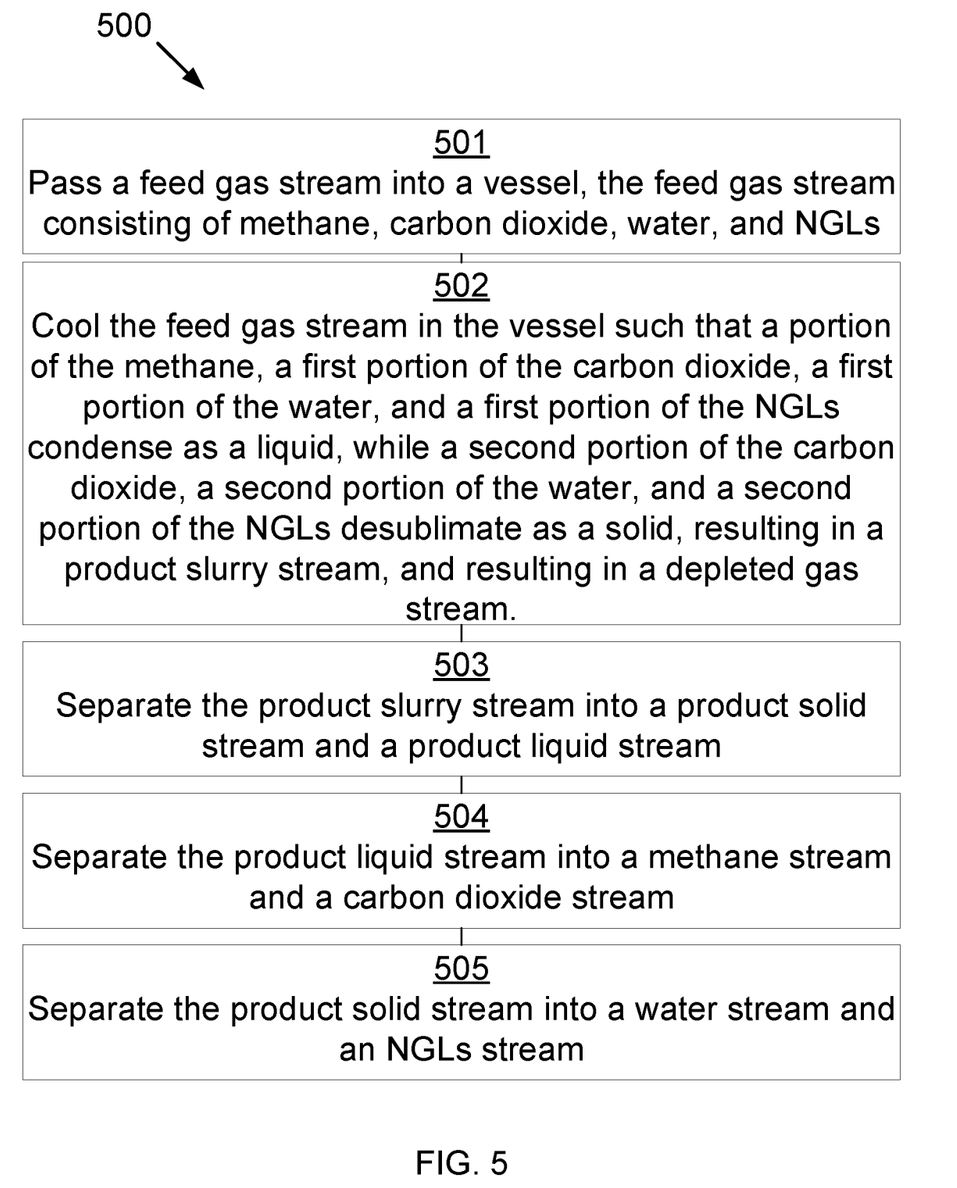
FIG. 5 is a block diagram depicting a method for separating components of a gas.

"Substantially all the water," as referenced above, is defined after the detailed description of FIG. 5.

Figure 1:
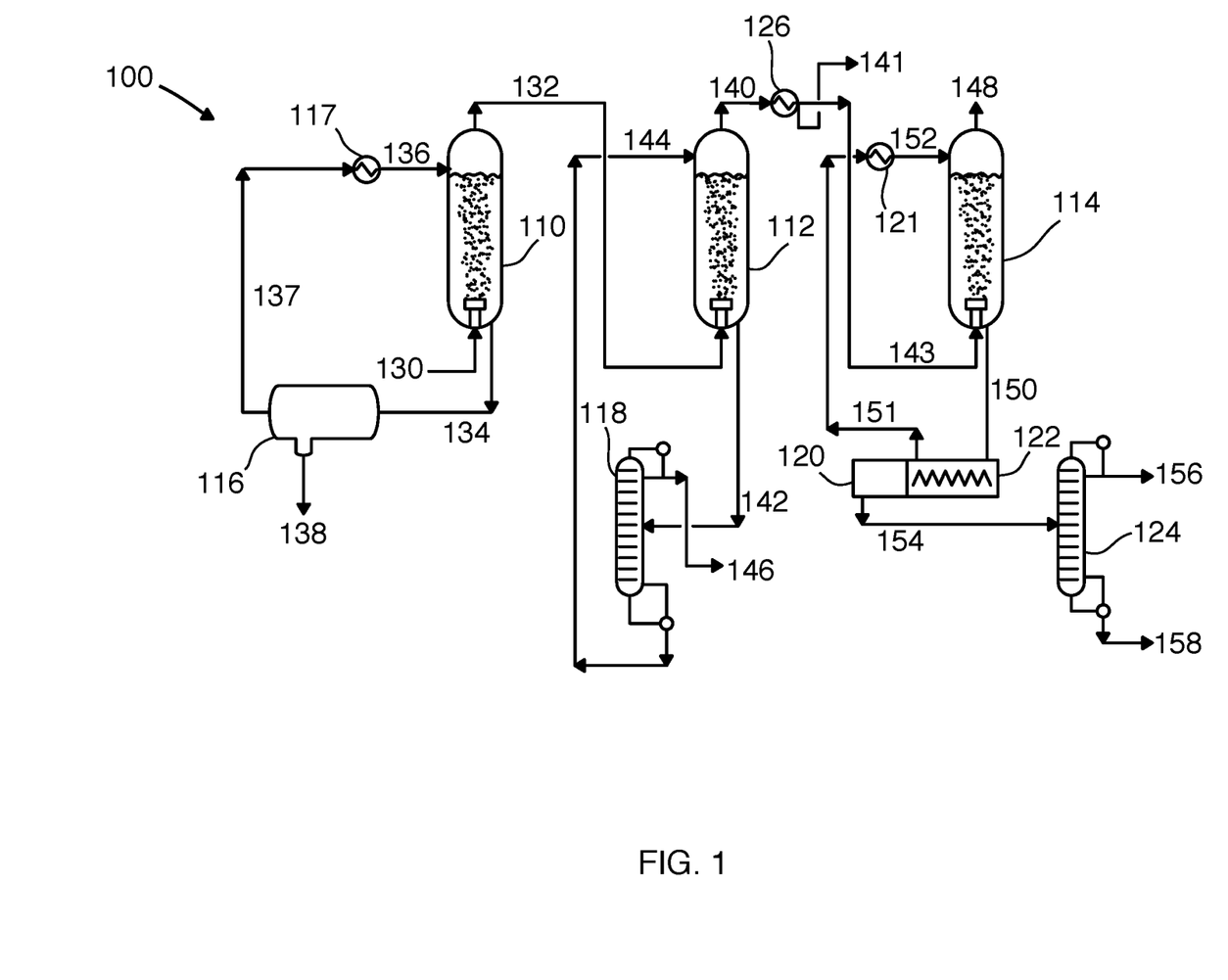
FIG. 1 is a flow diagram showing a process for separating components of a gas.

FIG. 1 is a flow diagram 100 showing a preferred process for separating components of a gas that may be used in the methods and systems disclosed herein. A first vessel 110, a second vessel 112, a third vessel 114, and a condensing exchanger 126 are provided. As depicted, vessels 110, 112, and 114 are preferably direct-contact exchangers, specifically bubblers. A natural gas feed stream 130 is bubbled into the first vessel 110, contacting a first contact liquid stream 136 descending through first vessel 110. The natural gas feed stream 130 consists of methane, water, carbon dioxide, and NGLs. The first contact liquid stream 136 cools the natural gas feed stream 130 such that substantially all the water condenses with the first contact liquid stream 136 to form a primary liquid stream 134. This also results in a first depleted gas stream 132. The primary liquid stream 134 is passed through a liquid-liquid separator 116 and a first-stage chiller 117, where the water stripped from the natural gas feed stream 130 is removed as a water discharge stream 138 and the warm first contact liquid stream 137 is cooled in a chiller 217 to produce the first contact liquid stream 136. The liquid-liquid separator may be a decanter or a settling vessel.

The first depleted gas stream 132 is bubbled into the second vessel 112, contacting a second contact liquid stream 144 descending through second vessel 112. The second contact liquid stream 144 cools the first depleted gas stream 132 such that a portion of the NGLs condense with the second contact liquid stream 144 to form a secondary liquid stream 142. This also results in a second depleted gas stream 140. The secondary liquid stream 142 is passed through a first distillation column 118 where the second contact liquid 144 is separated from the secondary liquid stream 142 and cooled for return to second vessel 112. The NGLs stream 146 is removed as a product. The second depleted gas stream 140 is passed through a condensing exchanger 126 where a portion of the methane is condensed to form a liquid methane stream, also resulting in a third depleted gas stream. In this embodiment, the condensing exchanger 126 has a liquid drain through which a portion of the liquid methane passes as a methane product 141 while any remaining liquid methane and the third depleted gas stream pass as mixed stream 143 to the third vessel 114. In some embodiments, a second portion of the carbon dioxide into the first liquid methane stream.

The mixed stream 143 is bubbled into the third vessel 114, contacting a third contact liquid stream 152 descending through third vessel 114. The third contact liquid stream 152 cools the third depleted gas stream 140 such that a first portion of the carbon dioxide desublimates as a solid and is entrained in the third contact liquid stream 152 to form a slurry product stream 150, also resulting in a fourth depleted gas stream 148. In some embodiments, a portion of the remaining methane in the third depleted gas stream condenses as a liquid as part of the slurry product stream 150. In some embodiments, a portion of the carbon dioxide condenses as a liquid in addition to the portion desublimating as a solid. In other embodiments, the carbon dioxide condenses only as a liquid. In some embodiments, nitrogen, argon, and hydrogen are present in the natural gas feed stream 130 and so the fourth depleted gas stream 148 contains the nitrogen, argon, and hydrogen that was present in the natural gas feed stream 130, minus any that dissolved in the first, second, or third contact liquid streams 136, 144, or 152, respectively.

The slurry product stream 150 is passed through a screw filtering device 122 where the warm third contact liquid stream 151 is filtered out of the slurry product stream 150 and cooled across third-stage chiller 121 to produce the third contact liquid stream 152. The solids from slurry product stream 150 pass immediately into a melting chamber 120 which melts the solid carbon dioxide into a liquid carbon dioxide stream 154. The liquid carbon dioxide stream 154 is passed through a third distillation column 124 to remove any impurities present in the liquid carbon dioxide stream 154, including any trace amounts of the warm third contact liquid stream 151 or residual methane.

Figure 2:
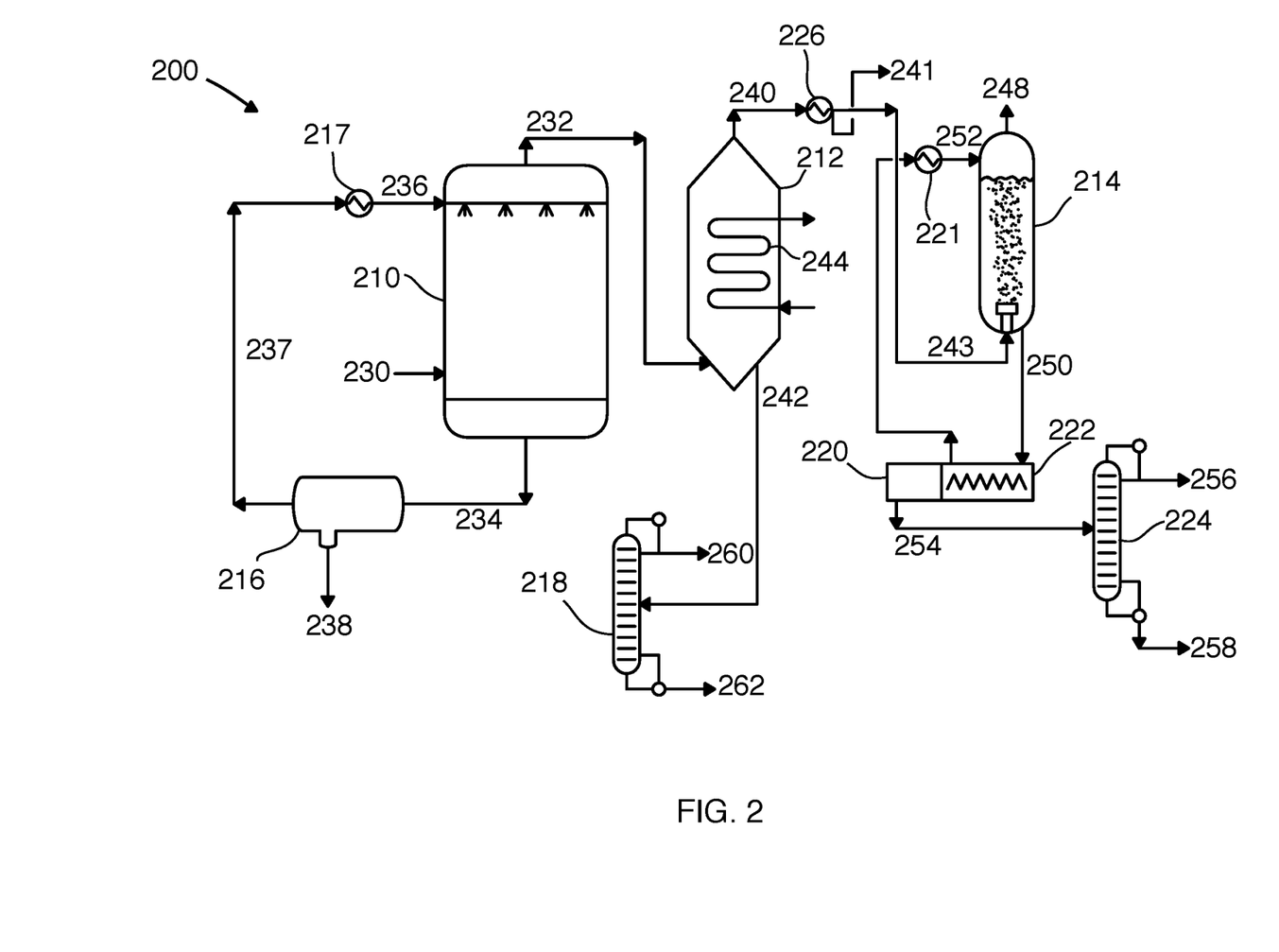
FIG. 2 is a flow diagram showing a process for separating components of a gas.

FIG. 2 is a flow diagram 200 showing a process for separating components of a gas that may be used in the methods and systems disclosed herein. A first vessel 210, a second vessel 212, a third vessel 214, and a condensing exchanger 226 are provided. Vessels 210 and 214 are direct-contact exchangers, specifically a spray tower and a bubbler. Second vessel 212 is an indirect-contact heat exchanger, specifically a shell-and-tube style exchanger. A natural gas feed stream 230 is passed into the first vessel 210, contacting a first contact liquid stream 236 descending as droplets through first vessel 210. The natural gas feed stream 230 consists of methane, water, carbon dioxide, NGLs, nitrogen, argon, hydrogen, mercaptans, and hydrogen sulfide. The first contact liquid stream 236 cools the natural gas feed stream 230 such that substantially all the water and a first portion of the NGLs condense into the first contact liquid stream and form a primary liquid stream 234, also resulting in a first depleted gas stream 232. The primary liquid stream 234 is passed through a liquid-liquid separator 216 and a first-stage chiller 217, where the water and NGLs stripped from the natural gas feed stream 230 are removed as a contaminated water discharge stream 238 and the warm first contact liquid stream 237 is cooled in a chiller 217 to produce the first contact liquid stream 236.

The first depleted gas stream 232 is passed into the second vessel 212 and is cooled by contact with refrigerant tubes 244. This cooling causes a second portion of the NGLs, a first portion of the carbon dioxide, and the hydrogen sulfide to condense and form a secondary liquid stream 242, also resulting in a second depleted gas stream 240. The secondary liquid stream 242 is passed through a first distillation column 218, separating the NGLs as an underflow 262 and the carbon dioxide and hydrogen sulfide as an overflow 260. The second depleted gas stream 240 is passed through the condensing exchanger 226 where a portion of the methane is condensed to form a liquid methane stream, also resulting in a third depleted gas stream. The condensing exchanger 226 has a liquid drain through which a portion of the liquid methane passes as a methane product 241 while any remaining liquid methane and the third depleted gas stream pass as mixed stream 243 to the third vessel 214.

The third depleted gas stream 243 is bubbled into the third vessel 214, contacting a third contact liquid stream 252 descending through third vessel 214. The third contact liquid stream 252 cools the second depleted gas stream 243 such that a second portion of the carbon dioxide desublimates as a solid and is entrained in the third contact liquid stream 252 to form a slurry product stream 250, also resulting in a third depleted gas stream 248.

In this embodiment shown in FIG. 2, the slurry product stream 250 is passed through a screw filtering device 222 where the warm third contact liquid stream 251 is filtered out of the slurry product stream 250 and cooled across third-stage chiller 221 to produce the third contact liquid stream 252. The solids from slurry product stream 250 pass into a melting chamber 220 which melts the solid carbon dioxide into a liquid carbon dioxide stream 254. The liquid carbon dioxide stream 254 is passed through a second distillation column 224 to remove any impurities present in the liquid carbon dioxide stream 254, including any trace amounts of the warm third contact liquid stream 251 or residual methane.

Figure 3:
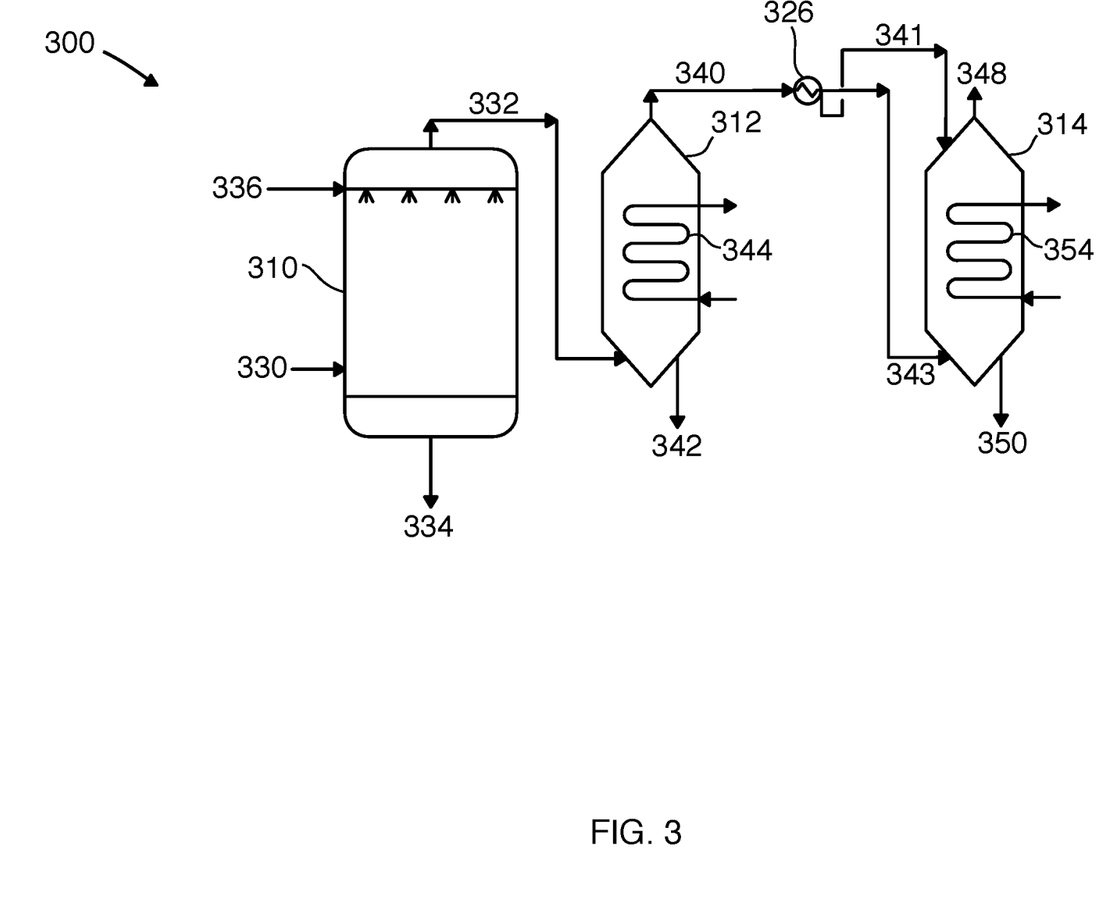
FIG. 3 is a flow diagram showing a process for separating components of a gas.

FIG. 3 is a flow diagram 300 showing a process for separating components of a gas that may be used in the devices, methods, and systems disclosed herein. A first vessel 310, a second vessel 312, a third vessel 314, and a condensing exchanger 326 are provided. In this depicted embodiment, the first vessel 310 is a direct-contact exchanger, specifically a spray tower. Vessels 312 and 314 are indirect-contact heat exchangers, specifically shell-and-tube style exchangers. A natural gas feed stream 330 is passed into the first vessel 310, contacting a first contact liquid stream 336 descending as droplets through first vessel 310. The natural gas feed stream 330 consists of methane, water, carbon dioxide, and NGLs. The first contact liquid stream 336 cools the natural gas feed stream 330 such that substantially all the water condenses into the first contact liquid stream 336 and forms a primary liquid stream 334, also resulting in a first depleted gas stream 332.

The first depleted gas stream 332 is passed into the second vessel 312 and cooled by contact with refrigerant tubes 344. This cooling causes a first portion of the NGLs to condense to form a secondary liquid stream 342, also resulting in a second depleted gas stream 340.

The second depleted gas stream 340 is passed into the condensing exchanger 326, causing a first portion of the methane to condense and form a liquid methane stream 341, which is removed by a drain from the condensing exchanger 326. This removal results in a third depleted gas stream 343.

The third depleted gas stream 343 is passed into a bottom portion of the third vessel 314 while the liquid methane stream 341 is passed into a top portion of the third vessel 314. The liquid methane is cooled by contact with the refrigerant tubes 354. This cooling is then transferred to the third depleted gas bubbling through the liquid methane. This cooling causes a second portion of the methane to condense as a liquid and a second portion of the carbon dioxide to desublimate as a solid. The liquid methane entrains the solid carbon dioxide as a slurry product stream 350, resulting also in a fourth depleted gas stream 348. In some embodiments, the slurry product stream 350 is then separated into a methane product stream and a carbon dioxide product stream. This separation may be done by distillation, flash separation, solid filtration, or a combination thereof.

Figure 4:
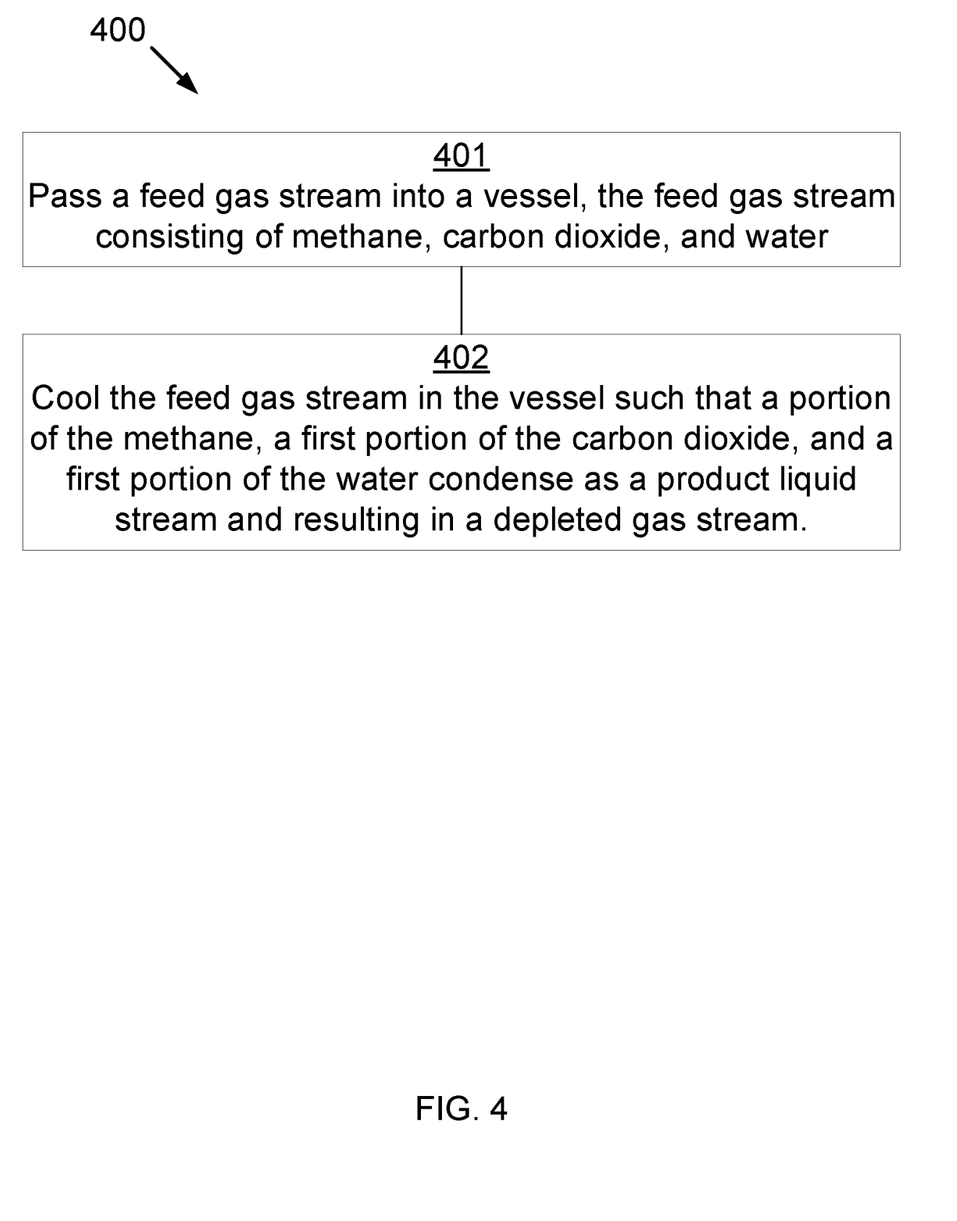
FIG. 4 is a block diagram depicting a method for separating components of a gas.

FIG. 4 is a block diagram for a method 400 for separating components of a gas that may be used in the methods and systems disclosed herein. At 401, a feed gas stream (consisting of methane, water, carbon dioxide, and NGLs) is cooled in a first vessel such that substantially all the water condenses to form a primary liquid stream, also resulting in a first depleted gas stream. At 402, the first depleted gas stream is cooled in a second vessel such that a portion of the NGLs condense to form a secondary liquid stream, also resulting in a second depleted gas stream. At 403, the second depleted gas stream is cooled in a condensing exchanger such that a portion of the methane condenses to form a liquid methane stream, resulting in a third depleted gas stream. At 404, the third depleted gas stream is cooled in the third vessel, thereby desublimating, condensing, or desublimating and condensing a second portion of the carbon dioxide into a final product stream, also resulting in a fourth depleted gas stream.

FIG. 5 is a diagram of a method 500 for separating components of a gas that may be used in the methods and systems disclosed herein. At 501, a feed gas stream (consisting of methane, water, carbon dioxide, NGLs, hydrogen, nitrogen, argon, mercaptans, and hydrogen sulfide) is cooled in a first vessel such that substantially all the water and a first portion of the NGLs condense to form a primary liquid stream, also resulting in a first depleted gas stream. At 502, the first depleted gas stream is cooled in a second vessel such that a second portion of the NGLs and a first portion of the carbon dioxide condense to form a secondary liquid stream, also resulting in a second depleted gas stream. At 503, the second depleted gas stream is cooled in a condensing exchanger such that a first portion of the methane condenses to form a liquid methane stream, resulting in a third depleted gas stream. At 504, the third depleted gas stream is cooled in the third vessel, condensing a second portion of the methane and desublimating, condensing, or desublimating and condensing a second portion of the carbon dioxide into a final product stream, also resulting in a fourth depleted gas stream.

In some embodiments, the fourth depleted gas stream contains substantially no methane. "Substantially no methane" may be less than 5 wt % methane, preferably less than 1 wt % methane, and most preferably less than 0.3 wt % methane.

In some embodiments, substantially all of the water is removed from the feed gas stream. In a preferred embodiment, "substantially all of the water" should leave no more than 1 ppm water in the fourth depleted gas stream. In a more preferred embodiment, "substantially all of the water" should leave no more than 100 ppb water in the fourth depleted gas stream. In an even more preferred embodiment, "substantially all of the water" should leave no more than 10 ppb water in the fourth depleted gas stream. In a most preferred embodiment, "substantially all of the water" should leave no more than 1 ppb water in the fourth depleted gas stream.

In one embodiment, substantially all of the NGLs is removed from the feed gas stream. In a preferred embodiment, "substantially all of the NGLs" should leave no more than 1 ppm NGLs in the fourth depleted gas stream. In a more preferred embodiment, "substantially all of the NGLs" should leave no more than 100 ppb NGLs in the fourth depleted gas stream. In an even more preferred embodiment, "substantially all of the NGLs" should leave no more than 10 ppb NGLs in the fourth depleted gas stream. In a most preferred embodiment, "substantially all of the NGLs" should leave no more than 1 ppb NGLs in the fourth depleted gas stream.

In one embodiment, substantially all of the carbon dioxide is removed from the feed gas stream. In a preferred embodiment, "substantially all of the carbon dioxide" should leave no more than 120,000 ppm carbon dioxide in the fourth depleted gas stream. In a more preferred embodiment, "substantially all of the carbon dioxide" should leave no more than 50,000 ppm carbon dioxide in the fourth depleted gas stream. In an even more preferred embodiment, "substantially all of the carbon dioxide" should leave no more than 1,000 ppm carbon dioxide in the depleted gas stream. In a most preferred embodiment, "substantially all of the carbon dioxide" should leave no more than 50 ppm carbon dioxide in the depleted gas stream.

In some embodiments, the NGLs comprise compounds selected from the group consisting of ethane, propane, butane, isobutane, pentane, natural gasoline, cyclic hydrocarbons, aromatic hydrocarbons, or combinations thereof.

In some embodiments, the first vessel, the second vessel, and the third vessel may be direct-contact exchangers. Direct-contact exchangers provide cooling through contact with one or more contact liquid streams. These include bubblers, spray towers, or fluidized beds. In some embodiments, the contact liquid streams are a mixture of a solvent and an ionic compound. The solvent may be water, hydrocarbons, liquid ammonia, liquid carbon dioxide, cryogenic liquids, or a combination thereof. The ionic compound may be potassium carbonate, potassium formate, potassium acetate, calcium magnesium acetate, magnesium chloride, sodium chloride, lithium chloride, calcium chloride, or a combination thereof.

In some embodiments, the contact liquid streams may be a mixture of a solvent and a soluble organic compound. The solvent may be water, hydrocarbons, liquid ammonia, liquid carbon dioxide, cryogenic liquids, or a combination thereof. The soluble organic compound may be glycerol, ammonia, propylene glycol, ethylene glycol, ethanol, methanol, or a combination thereof.

In some embodiments, the contact liquid streams may be ethers, alcohols, hydrocarbons, liquid ammonia, liquid carbon dioxide, cryogenic liquids, or a combination thereof. The hydrocarbons may be 1,1,3-trimethylcyclopentane, 1,4-pentadiene, 1,5-hexadiene, 1-butene, 1-methyl-1-ethylcyclopentane, 1-pentene, 2,3,3,3-tetrafluoropropene, 2,3-dimethyl-1-butene, 2-chloro-1,1,1,2-tetrafluoroethane, 2-methylpentane, 3-methyl-1,4-pentadiene, 3-methyl-1-butene, 3-methyl-1-pentene, 3-methylpentane, 5-methyl-1-hexene, 5-methyl-1-pentene, 5-methylcyclopentene, 5-methyl-trans-2-pentene, bromochlorodifluoromethane, bromodifluoromethane, bromotrifluoroethylene, chlorotrifluoroethylene, cis 2-hexene, cis-1,3-pentadiene, cis-2-hexene, cis-2-pentene, dichlorodifluoromethane, difluoromethyl ether, trifluoromethyl ether, dimethyl ether, ethyl fluoride, ethyl mercaptan, hexafluoropropylene, isobutane, isobutene, isobutyl mercaptan, isopentane, isoprene, methyl isopropyl ether, methylcyclohexane, methylcyclopentane, methylcyclopropane, n,n-diethylmethylamine, octafluoropropane, pentafluoroethyl trifluorovinyl ether, propane, sec-butyl mercaptan, trans-2-pentene, trifluoromethyl trifluorovinyl ether, vinyl chloride, bromotrifluoromethane, chlorodifluoromethane, dimethyl silane, ketene, methyl silane, perchloryl fluoride, propylene, vinyl fluoride, or a combination thereof. The alcohols may be methanol, ethanol, n-propanol, isopropanol, n-butanol, isobutanol, or a combination thereof.

In some embodiments, the first vessel, the second vessel, and the third vessel may be indirect-contact exchangers. In one embodiment, where the second vessel is an indirect-contact exchanger and the feed gas stream also contains NGLs, NGLs condense before the methane and the carbon dioxide begin to condense, and the NGLs are removed from the second heat exchanger.

The invention has been described with reference to various specific and preferred embodiments and techniques. Nevertheless, it understood that many variations and modifications may be made while remaining within the spirit and scope of the invention.

What is claimed is:

1. A method for separating components of a gas comprising:
cooling a feed gas stream in a first vessel, wherein the feed gas stream comprises methane, water, carbon dioxide, and NGLs, such that a portion of the water condenses to form a primary liquid stream, resulting in a first depleted gas stream leaving the first vessel;
cooling the first depleted gas stream in a second vessel such that a first portion of the NGLs condense to form a secondary liquid stream, resulting in a second depleted gas stream leaving the second vessel;
cooling the second depleted gas stream in a condensing exchanger such that a first portion of the methane condenses to form a liquid methane stream, resulting in a third depleted gas stream leaving the condensing exchanger;
cooling the third depleted gas stream in a third vessel such that a first portion of the carbon dioxide condenses, desublimates, or condenses and desublimates as a final product stream, resulting in a fourth depleted gas stream leaving the third vessel; and
wherein cooling the feed gas stream in the first vessel condenses a second portion of the NGLs and a second portion of the carbon dioxide into the primary liquid stream.

2. The method of claim 1, wherein the NGLs comprise compounds selected from the group consisting of ethane, propane, butane, isobutane, pentane, natural gasoline, cyclic hydrocarbons, aromatic hydrocarbons, or combinations thereof.

3. The method of claim 1, further comprising separating the NGLs and the water in a liquid-liquid separator, wherein the liquid-liquid separator comprises a decanter, a settling tank, or a combination thereof.

4. The method of claim 1, wherein cooling the first depleted gas stream condenses a third portion of the carbon dioxide into the secondary liquid stream.

5. The method of claim 4, further comprising separating the secondary liquid stream into a carbon dioxide product stream and a NGLs product stream.

6. The method of claim 1, wherein cooling the third depleted gas stream condenses a second portion of the methane into the final product stream.

7. The method of claim 6, further comprising separating the final product stream into a methane product stream and a carbon dioxide product stream.

8. The method of claim 1, wherein one or more of the first vessel, the second vessel, and the third vessel is a direct-contact exchanger, providing cooling through contact with one or more of a first contact liquid stream, a second contact liquid stream, and a third contact liquid stream.

9. The method of claim 8, wherein one or more of the first contact liquid stream, the second contact liquid stream, and the third contact liquid stream comprise a mixture of a solvent and an ionic compound, the solvent selected from the group consisting of water, hydrocarbons, liquid ammonia, liquid carbon dioxide, cryogenic liquids and combinations thereof, and the ionic compound selected from the group consisting of potassium carbonate, potassium formate, potassium acetate, calcium magnesium acetate, magnesium chloride, sodium chloride, lithium chloride, calcium chloride and combinations thereof.

10. The method of claim 8, wherein one or more of the first contact liquid stream, the second contact liquid stream, and the third contact liquid stream comprise a mixture of a solvent and a soluble organic compound, the solvent selected from the group consisting of water, hydrocarbons, liquid ammonia, liquid carbon dioxide, cryogenic liquids, or a combination thereof, and the soluble organic compound selected from the group consisting of glycerol, ammonia, propylene glycol, ethylene glycol, ethanol, methanol, or a combination thereof.

11. The method of claim 8, wherein one or more of the first contact liquid stream, the second contact liquid stream, and the third contact liquid stream are selected from the group consisting of ethers, alcohols, hydrocarbons, liquid ammonia, liquid carbon dioxide, cryogenic liquids, and combinations thereof.

12. The method of claim 11, wherein the hydrocarbons are selected from the group consisting of 1,1,3-trimethylcyclopentane, 1,4-pentadiene, 1,5-hexadiene, 1-butene, 1-methyl-1-ethylcyclopentane, 1-pentene, 2,3,3,3-tetrafluoropropene, 2,3-dimethyl-1-butene, 2-chloro-1,1,1,2-tetrafluoroethane, 2-methylpentane, 3-methyl-1,4-pentadiene, 3-methyl-1-butene, 3-methyl-1-pentene, 3-methylpentane, 5-methyl-1-hexene, 5-methyl-1-pentene, 5-methylcyclopentene, 5-methyl-trans-2-pentene, bromochlorodifluoromethane, bromodifluoromethane, bromotrifluoroethylene, chlorotrifluoroethylene, cis 2-hexene, cis-1,3-pentadiene, cis-2-hexene, cis-2-pentene, dichlorodifluoromethane, difluoromethyl ether, trifluoromethyl ether, dimethyl ether, ethyl fluoride, ethyl mercaptan, hexafluoropropylene, isobutane, isobutene, isobutyl mercaptan, isopentane, isoprene, methyl isopropyl ether, methylcyclohexane, methylcyclopentane, methylcyclopropane, n,n-diethylmethylamine, octafluoropropane, pentafluoroethyl trifluorovinyl ether, propane, sec-butyl mercaptan, trans-2-pentene, trifluoromethyl trifluorovinyl ether, vinyl chloride, bromotrifluoromethane, chlorodifluoromethane, dimethyl silane, ketene, methyl silane, perchloryl fluoride, propylene, vinyl fluoride, and combinations thereof.

13. The method of claim 11, wherein the alcohols are selected from the group consisting of methanol, ethanol, n-propanol, isopropanol, n-butanol, isobutanol, and combinations thereof.

14. The method of claim 8, further comprising separating the first contact liquid stream from the primary liquid stream.

15. The method of claim 8, further comprising separating the second contact liquid stream from the secondary liquid stream.

16. The method of claim 8, further comprising separating the third contact liquid stream from the final product stream.

17. The method of claim 1, wherein one or more of the first vessel, the second vessel, and the third vessel is an indirect-contact exchanger.

18. The method of claim 1, wherein the feed gas stream further comprises a gas selected from the group consisting of nitrogen, argon, hydrogen sulfide, mercaptans, hydrogen, and combinations thereof.

19. A method for separating components of a gas comprising:
cooling a feed gas stream in a first vessel, wherein the feed gas stream comprises methane, water, carbon dioxide, and NGLs, such that a portion of the water condenses to form a primary liquid stream, resulting in a first depleted gas stream leaving the first vessel;
cooling the first depleted gas stream in a second vessel such that a first portion of the NGLs condense to form a secondary liquid stream, resulting in a second depleted gas stream leaving the second vessel;
cooling the second depleted gas stream in a condensing exchanger such that a first portion of the methane condenses to form a liquid methane stream, resulting in a third depleted gas stream leaving the condensing exchanger;

cooling the third depleted gas stream in a third vessel such that a first portion of the carbon dioxide condenses, desublimates, or condenses and desublimates as a final product stream, resulting in a fourth depleted gas stream leaving the third vessel; and wherein a portion of the liquid methane stream is withdrawn between the condensing exchanger and the third vessel.

* * * * *